(12) United States Patent
Clarke

(10) Patent No.: US 7,544,241 B2
(45) Date of Patent: Jun. 9, 2009

(54) METHOD FOR SEALING A CONDUIT AND COMPOSITION FOR USE THEREIN

(75) Inventor: Robert Owen Clarke, St. Catharines (CA)

(73) Assignee: ASI Group Ltd., St. Catherines, Ontario (CA)

( * ) Notice: Subject to any disclaimer, the term of this patent is extended or adjusted under 35 U.S.C. 154(b) by 175 days.

(21) Appl. No.: 11/459,691

(22) Filed: Jul. 25, 2006

(65) Prior Publication Data
US 2008/0023091 A1    Jan. 31, 2008

(51) Int. Cl.
C04B 22/04    (2006.01)

(52) U.S. Cl. .................. 106/644; 106/713

(58) Field of Classification Search .......... 106/644, 106/713
See application file for complete search history.

(56) References Cited

U.S. PATENT DOCUMENTS

| 4,105,461 A | 8/1978 | Racciato |
| 5,432,215 A | 7/1995 | Girg et al. |
| 6,110,271 A | 8/2000 | Skaggs et al. |
| 6,800,129 B2 * | 10/2004 | Jardine et al. ............... 106/724 |
| 7,147,708 B2 * | 12/2006 | Nagler, Jr. et al. |
| 2004/0055512 A1 * | 3/2004 | Nagler, Jr. |
| 2004/0055513 A1 * | 3/2004 | Nagler, Jr. |
| 2004/0072939 A1 | 4/2004 | Cornman |
| 2004/0149172 A1 | 8/2004 | Jardine et al. |
| 2005/0056190 A1 * | 3/2005 | Nagler, Jr. et al. |

OTHER PUBLICATIONS

JP 07206498 (Nara et al.) Aug. 8, 1995 abstract.*
Article: Psyllium Seeds—D&B D-U-N-S® No. 91-859-8595- "www.psylliums.com".

* cited by examiner

*Primary Examiner*—Paul Marcantoni
(74) *Attorney, Agent, or Firm*—Philip C. Mendes da Costa; Bereskin & Parr LLP

(57) ABSTRACT

A grout for repairing a conduit, such as an underwater conduit comprises, as mixed, from 40 to 50 wt % cement; from 25 to 35 wt % water; and, from 0.05 to 0.25 wt % psyllium husk; based on the total weight of the grout as mixed.

5 Claims, 2 Drawing Sheets

METHOD FOR SEALING A CONDUIT AND COMPOSITION FOR USE THEREIN

FIELD OF THE INVENTION

This invention relates to methods and compositions useful to repair liquid conduits so as to reduce or terminate the leak of fluid from the conduit. In a particularly preferred embodiment, this invention relates to methods and compositions to repair liquid conduits that are positioned underwater.

BACKGROUND OF THE INVENTION

Conduits which are used to convey a fluid underwater are typically used in industry. For example, such conduits may be utilized as discharge pipes for waste water treatment plants wherein waste water is conveyed through the conduit, under water, to a discharge location which is distal to the shore. Other such underwater conduits include intakes and transmission pipelines that may transport process, drinking or cooling water.

Typically, underwater conduits are prepared by securing lengths of pipe together, such as by means of an external clamp, flanges, bell and spigot fittings, mechanical couplers, welding or mating of threaded ends, which forms a joint connecting two adjacent pipes. In all such cases, the end of one pipe is positioned adjacent the beginning of the next pipe. The external clamp or the like is utilized to secure the two ends together and to create a water-tight seal between the two adjacent pipes. Accordingly, once assembled, fluid (e.g. waste water or the like) may be conveyed through the conduit without the waste water exiting the conduit via a joint or, alternately, water will not seep into the pipe from the body of water through which the pipe passes.

Over time, leaks may develop in an underwater conduit. For example, the lake bed, river bed or ocean floor in which the conduit is placed may settle resulting in stress on the clamp or the like which secures the ends of two pipes together. This stress may result in the relative movement of one pipe compared to the adjacent pipe thereby producing a gap through which fluid may leak. Alternately, one or more of the pipes and the clamp or the like may deteriorate producing a gap or crack through which fluid may leak.

When a leak occurs, then corrective steps may be taken. For example, a liner may be installed in the conduit. Alternately, spot repair liners may be installed to cover the joints where two pipes connect. Such liners are designed to create a water tight seal between the exterior surface of the spot repair liner and the interior surface of the conduit thus creating a continuous water tight surface which bridges the portion of the conduit in which the leak has occurred. However, the efficacy of spot liners is based on many factors including pipe diameter and the backing material. Accordingly, in some applications, spot repair liners are not desirable.

An alternate method for sealing a gap comprises applying a new cement coating to the inside of the pipe. Such a coating may be applied by various techniques known in the art including pneumatically (shot-crete), or hydraulically (spun in place) or by slip-forming.

Various types of concrete compositions are known. Further, it is known to add fibres to cement to increase the flexural and tensile strength of the cured product (Nagler Jr. et al, United States Patent Publication No. 2005/0056190). As disclosed by Nagler et al, an aqueous gel solution is formed from water and a thickener. Fibres are then added to the gel solution. Subsequently, the gel composition containing the fibres is combined with a cement composition. Nagler et al discloses a large variety of thickeners including psyllium.

SUMMARY OF THE INVENTION

In accordance with the instant invention, it has been determined that a grout material which utilizes psyllium husk advantageously may be used underwater to seal a fluid conduit. The sealing mixture, which may also be referred to as a cement grout, produces a pumpable mixture which converts to a gel in about 5-10 minutes as the soluble fibre in the psyllium husk hydrates. The cement grout may be conveyed to a location in a conduit which requires sealing by any means known in the art. The cement grout has sufficient flow characteristics to permit the cement to at least partially fill a gap (up to 5/8 inch) and be retained therein as the grout cures (which typically takes about 24 hours).

The cement grout may be conveyed to the conduit by mixing the constituent materials together and passing them through a pipe which is connected in flow communication to an underwater conduit. Subsequent to the pumping operation, i.e., after the grout has filled the gap, the delivery conduit(s) are flushed of the repair cement grout to prevent blockage. Preferably, a form or packer is utilized to isolate the pipe section to be repaired from the main conduit. A hose may then be used to deliver the cement grout to the pipe section and to provide water to flush the pipe section subsequent to the repair operation.

One advantage of the instant invention is that the cement grout maintains its consistency as it cures. Accordingly, the grout remains in position in the conduit so as to seal the conduit. In particular, once the cement grout has been placed in position in an underwater conduit, the exterior surface of the grout is exposed to the water in the body of water that is exterior to the underwater conduit. Upon exposure to water, the cement grout retains sufficient viscosity such that the grout does not flow thereby reopening a gap prior to the cement grout curing.

Psyllium husk contains both soluble and insoluble fibres. Without being limited by theory, it is believed that the use of the insoluble fibre in the psyllium husk serves as a blocking material. In particular, the insoluble fibre may tend to physically block and plug small leaks, as well as bridging gaps which form in the wall of the underwater conduit. Further, the soluble fibre forms a gel which renders the cement grout self-supporting. The soluble fibre uses sufficient water to form a gel without dispersing through the available volume of water as is typical of other gelling agents (which are also known as thickeners). As the soluble fibre hydrates but does not disperse, a self-supporting cement grout is produced. As the grout is exposed to additional water (e.g., the water in the body of water that comes into contact with the external portion of the group that fills a gap), the soluble fibre does not disperse and reduce the viscosity of the grout resulting in the gap being reopened prior to the grout curing.

Accordingly, in accordance with one aspect of the instant invention, there is provided a method of sealing an underwater conduit comprising:
(a) preparing a mixture comprising:
(i) cement;
(ii) water; and,
(iii) psyllium husk;
(b) providing the mixture at a location in the underwater conduit that requires sealing.

In accordance with another aspect of the instant invention, there is provided a method of sealing a conduit comprising:
(a) preparing a mixture comprising:

(i) from 40 to 50 wt % cement;
(ii) from 25 to 35 wt % water;
(iii) from 0.05 to 0.25 wt % psyllium husk; and,
(iv) from 20 to 30 wt % of a density adjustment agent; and, (b) providing the mixture at a location in the underwater conduit that requires sealing.

In one embodiment, the method further comprises passing the mixture through a passage to the underwater conduit and conveying the mixture through the passage to the location in the underwater conduit that requires sealing.

In another embodiment, the method further comprises including a density adjustment agent in the mixture.

In another embodiment, step (a) comprises preparing the mixture from 40 to 50 wt % cement, from 25 to 35 wt % water, from 20 to 30 wt % density adjustment agent and from 0.05 to 0.25 wt % psyllium husk, based on the total weight of the cement, water, density adjustment agent and psyllium husk.

In another embodiment, step (a) comprises preparing the mixture from 42 to 48 wt % cement, from 27 to 33 wt % water, from 21 to 27 wt % density adjustment agent and from 0.07 to 0.23 wt % psyllium husk, based on the total weight of the cement, water, density adjustment agent and psyllium husk.

In another embodiment, step (a) comprises preparing the mixture from 44 to 46 wt % cement, from 29 to 31 wt % water, from 23 to 25 wt % density adjustment agent and from 0.12 to 0.14 wt % psyllium husk, based on the total weight of the cement, water, density adjustment agent and psyllium husk.

In another embodiment, the method further comprises selecting microspheres as the density adjustment agent.

In another embodiment, the method further comprises selecting Portland cement as the cement and, preferably, a Portland cement that is for general use (in particular a Type 10 cement as classified by CSA A5 or Type 1 cement as classified by ASTM C150).

In another embodiment, the method further comprises selecting psyllium husk that comprises from 60 to 80 wt % soluble fibre and from 5 to 25 wt % insoluble fibre, based on the total weight of the psyllium husk.

In another embodiment, the method further comprises selecting psyllium husk that comprises from 65 to 75 wt % soluble fibre and from 10 to 20 wt % insoluble fibre, based on the total weight of the psyllium husk.

In another embodiment, the method further comprises combining the water and the cement to obtain a cement slurry, combining the density adjustment agent and the cement slurry to obtain a lightened slurry and combining the psyllium husk with the lightened slurry to obtain the mixture.

In another embodiment, the method further comprises conveying the mixture to the underwater conduit using a pump and the psyllium husk is combined with the lightened slurry immediately upstream of the pump. Preferably, the psyllium husk is introduced to the lightened slurry at an intake of the pump.

In accordance with another aspect of the instant invention, there is provided an underwater grout comprising, as mixed:
from 40 to 50 wt % cement;
from 25 to 35 wt % water; and,
from 0.05 to 0.25 wt % soluble psyllium husk;
based on the total weight of the grout as mixed.

In one embodiment, the underwater grout further comprises from 20 to 30 wt % of a density adjustment agent, In another embodiment, the grout may be of any composition set out previously with respect to the methods. For example, as mixed the grout may comprise from 42 to 48 wt % cement, from 27 to 33 wt % water, from 21 to 27 wt % density adjustment agent and from 0.07 to 0.23 wt % psyllium husk.

In another embodiment, the psyllium husk comprises from 60 to 80 wt % soluble fibre and from 5 to 25 wt % insoluble fibre, based on the total weight of the psyllium husk.

In accordance with another aspect of the instant invention, there is provided the use of psyllium husk in a cement composition for use in sealing a conduit and, preferably, an underwater conduit.

The cement composition may be of any composition of the grout set out previously with respect to the methods. For example, in one embodiment, the cement composition as mixed comprises from 40 to 50 wt % cement, from 25 to 35 wt % water, from 20 to 30 wt % density adjustment agent and from 0.05 to 0.25 wt % psyllium husk, based on the total weight of the grout as mixed.

In another embodiment, the psyllium husk comprises from 60 to 80 wt % soluble fibre and from 5 to 25 wt % insoluble fibre, based on the total weight of the psyllium husk.

BRIEF DESCRIPTION OF THE DRAWINGS

These and other advantages of the instant invention will be more fully and completely understood in conjunction with the following description of a preferred embodiment of the invention in which.

DETAILED DESCRIPTION OF THE INVENTION

Figure 1:
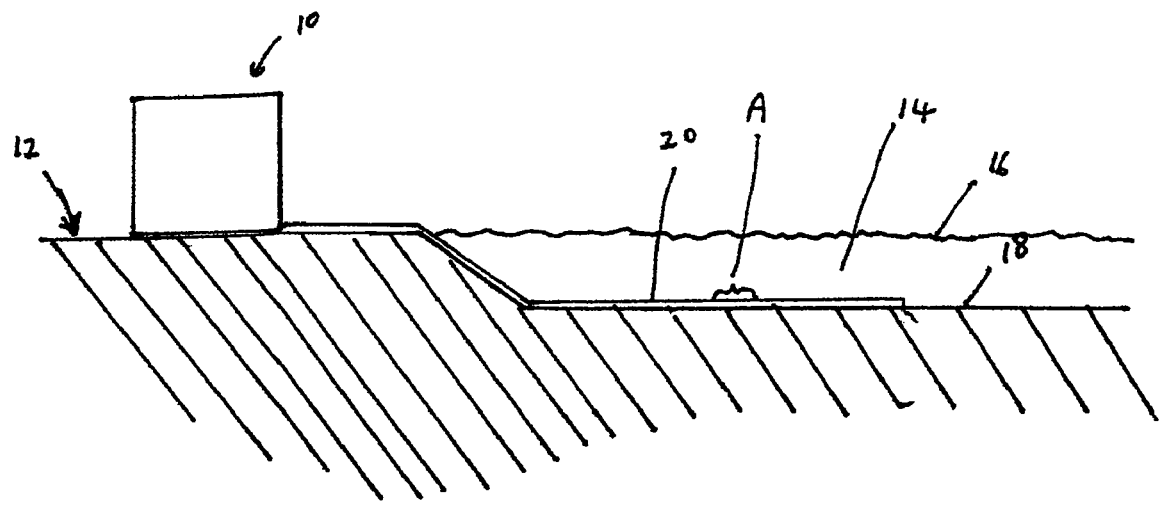
FIG. 1 is a schematic drawing of an industrial facility having an underwater conduit.

FIG. 1 exemplifies an underwater conduit which may be utilized. As shown in FIG. 1, plant 10 is positioned on land 12 adjacent to lake 14 which has a water surface 16 and a lake bed 18. Plant 10 may be any facility which requires a conduit to extend under a lake, ocean, river or other body of water. It will be appreciated that plant 10 need not be positioned immediately adjacent the shore of lake 16 provided that at least a portion of conduit 20 extends underwater. Accordingly, if a leak occurs in conduit 20, e.g. a crack develops in the area designated as "A" in FIG. 1, the contents of conduit 20 may pass through the crack and enter lake 14. Alternately, if conduit 20 is sufficiently deep, water from lake 14 may flow into conduit 20 if the water pressure adjacent the exterior surface of conduit 20 is greater than the liquid pressure in conduit 20.

It will be appreciated that, in accordance with this invention, the cement grout may be used to seal any gap which occurs in a pipe through which liquid is conveyed. For example, if a crack develops in a pipe which comprises a portion of conduit 20, then the cement grout may be utilized to seal the crack. Alternately, a leak may occur at a joint of two pipes. In one aspect of this invention, the cement grout may be used on a conduit at any location (e.g. above water, under the ground, suspended in the air, etc.). Accordingly, the cement grout may be used to seal a conduit even if there is not material (water, earth, etc,) positioned on the exterior of the conduit. In a particularly preferred aspect, the cement grout is used to seal a conduit that is positioned underwater.

The following description exemplifies the use of the cement grout to seal a gap, which occurs in a joint between two pipes. It will be appreciated by those skilled in the art that the cement grout may be used to seal cracks or other such leaks which develop in an underwater conduit 20.

Figure 2:
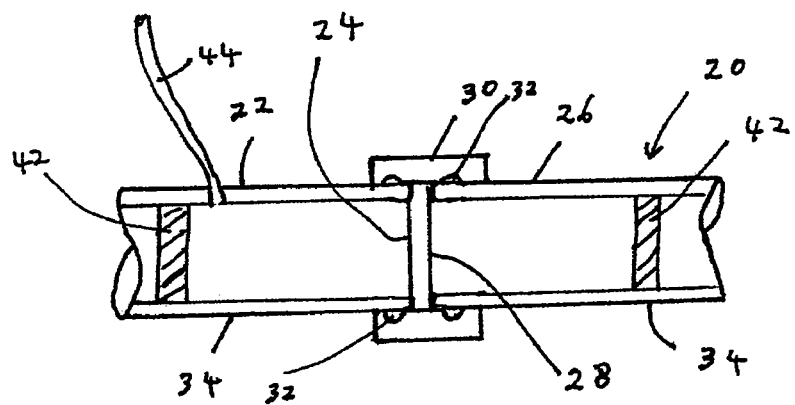
FIG. 2 is a longitudinal section through the underwater conduit shown in FIG. 1 in the region of area A; and, FIG. 3 is an enlargement of the joint shown in FIG. 2 once the joint has aged and developed a leak.
Figure 3:
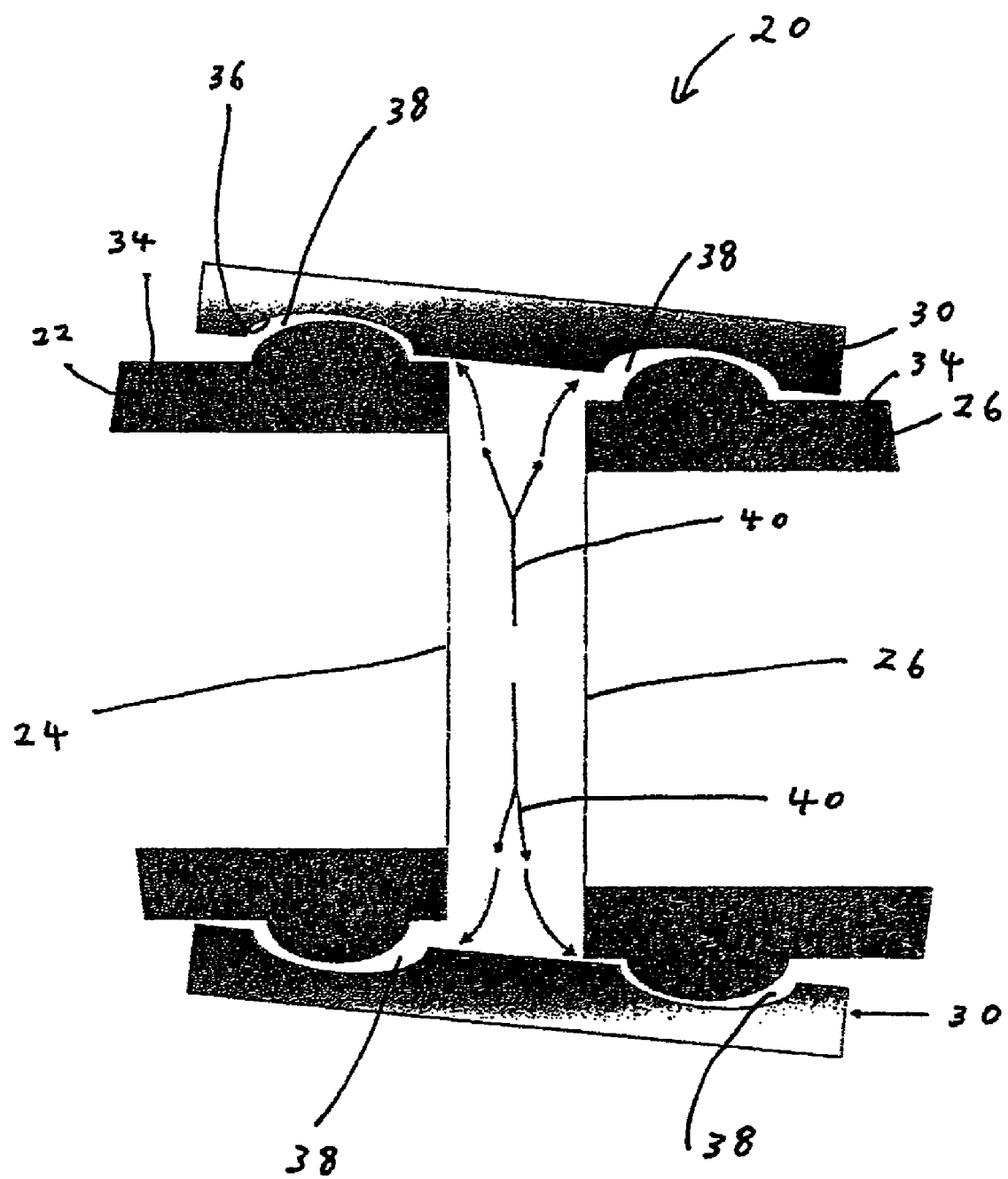

Referring to FIG. 2, a joint between two pipes 22, 26 is exemplified. As shown therein, first pipe 22 has end 24 which is positioned adjacent end 28 of second pipe 26. Ends 24, 28 are sealed, for example, by an external ring clamp 30 which surrounds ends 24, 28. In order to secure ring clamp 30 in position, protrusions 32 may provided on the external surface 24 of pipes 22, 26 and which seat in recesses 36 of external ring clamp 30. A gasket, O-ring or the like may also be utilized to seal such a joint. At some point, the exterior surface 34 and/or ring clamp 30 may deteriorate to produce a gap therethrough. Alternately, or in addition, the relative position of ends 24 and 26 may be displaced so as to produce a gap between external surface 34 and ring clamp 36. See for example FIG. 3. Alternately, or in addition, a pipe may crack producing a gap through which fluid may flow. When this occurs, fluid may flow from inside conduit 20 through the gap 38 into lake 14. It will be appreciated that such gaps may occur even if a gasket, O-ring or the like is also utilized in the construction of a joint and that the composition and method of this invention may be used to repair any joint or leak that may occur.

In accordance with the instant invention, a grout composition is utilized to seal gap 38. Accordingly, the grout composition may be conveyed to gap 38 by any means known in the art. For example, the grout composition may be prepared and subsequently passed through a pump which is in fluid communication with conduit 20. The grout composition may be conveyed through conduit 20. At the location of gaps 38, a portion of the grout cement will tend to flow into gap 38 thereby sealing gap 38. Once the cement grout cures, gap 38 is sealed thereby sealing the interior of conduit 20 from fluid communication with the water in lake 14 via former gap 38.

The grout composition comprises cement, water and psyllium husk. Preferably, the cement grout also includes a density adjustment agent.

The cement may be any cement composition which is known in the art to line pipes and the like. It will be appreciated by those skilled in the art that the cement need not be mixed with any aggregate and, preferably, does not contain any aggregate therein. Preferably, the cement is a Portland cement and more preferably, is a Portland cement for general use. General use Portland cements are classified as a Type 10 cement as classified by CAN A5 and a Type 1 cement as classified by ASTM C150.

The psyllium husk comprises a combination of soluble fibre (mucilage) and insoluble fire (the seed casing). The soluble fibre, upon hydration, results in the cement grout being gelatinous. The insoluble fibre provides an inert filler that helps to bridge gaps in a joint or crack in a pipe that allows the leakage of fluid therethrough. One particular advantage of the mucilage is that the gelation is relatively pH tolerant.

Psyllium husk is a white fibrous material that is derived from psyllium seeds, such as crushing or shredding thereof. Psyllium husk comprises the epidermis and the collapsed adjacent layers removed from the dried ripe seeds of *Plantago Ovata*. Such material is used in laxatives and various sources thereof are known in that art.

The relative proportion of soluble and insoluble fibre in psyllium husk may vary. Preferably, the psyllium husk contains from 60 to 80 wt. % soluble fibre and from 5 to 25 wt. % insoluble fibre, based upon the total weight of the psyllium husk. More preferably the psyllium husk contains from 65 to 75 wt. % soluble fibre and from 10 to 20 wt. % insoluble fibre, based upon the total weight of the psyllium husk. Most preferably, the psyllium husk comprises from 68 to 72 wt. % soluble fibre and from 13 to 17 wt. % insoluble fibre and, more preferably, from 70 to 72 wt. % soluble fibre and from 14 to 16 wt. % insoluble fibre.

Preferably, the cement grout further comprises a density adjustment agent. The density adjustment agent is typically an inert filler material that is utilized to provide a desired density to the cured cement grout. The filler material that is utilized may be selected based upon the composition of the uncured cement grout and the desired final density of the cured cement grout. Preferably, the density adjustment agent reduces the density of the uncured cement grout thereby producing a lighter weight grout per unit volume.

More preferably, the density adjustment agent has a relatively stable volume regardless of the pressure to which the grout is exposed. For example, in a cement grout that is utilized in an underwater conduit, the grout is exposed to elevated pressures. The density adjustment agent preferably has a relatively stable volume, e.g. a relatively stable external surface such that the density adjustment agent is effectively dimensionally stable even when used in a conduit that is 50 ft. or more, and more preferably 200 ft. or more below water.

Every 33 feet of water exerts one atmosphere of pressure. Accordingly, as the distance from the surface of a body of water increases, the density of air increases and the volume occupied by that air proportionally decreases. At 66 ft., the volume of air will decrease by two thirds. Accordingly, by providing a dimensionally stable density adjustment agent, the density adjustment agent will continue to provide a density adjustment effect even at depth. Preferably, the density adjustment agent comprises cenospheres, also referred to as microbubbles (such as Fillite®). The exterior surface of the Fillite® stabilizes the air entrained within the Fillite® thereby resulting in the density adjustment agent continuing to adjust the density of the cement grout even when utilized at depth.

The cement, psyllium husk and optional density adjustment agent are combined with water to produce a flowable cement grout. Cement grout may be prepared from 40 to 50 wt. % cement, from 25 to 35 wt. % water, from 20 to 30 wt. % density adjustment agent and from 0.05 to 0.25 wt. % psyllium husk, based upon the total weight of the mixture. More preferably, the cement grout may comprise from 42 to 48 wt. % cement, from 27 to 33 wt. % water, from 21 to 27 wt. % density adjustment agent and from 0.07 to 0.23 wt. % psyllium husk, based upon the total weight of these four elements. More preferably, the cement grout may comprise from 44 to 46 wt. % cement, from 29 to 31 wt. % water, from 23 to 25 wt. % density adjustment agent and from 0.12 to 0.14 wt. % psyllium husk, based upon the total weight of these four elements.

If the uncured cement grout has a large amount of cenospheres, e.g. above 30 wt. %, then the mixture will be relatively stiff thereby reducing its pumpability. If the cement grout includes a low amount of cenospheres (e.g. less than about 20 wt. %) then the density of the final grout may be too high. When used underwater, the cenospheres decrease the specific gravity of the fluid grout, making it relatively light in the water. This minimizes the relative weight of the grout, letting it remain more stable in the leak path and provide time for the cement grout to set up instead of flowing out if the cement grout had a higher density i.e. is heavier.

If the uncured cement grout contains too much of the soluble fibre contained in psyllium, then the mixture will be highly gelatinous resulting in a cement grout, which may not easily be pumped. Accordingly, the upper range of soluble fibre is preferably selected so as to maintain the cement grout pumpable (preferably less than 0.25 wt. %). If the cement grout contains a relatively low amount of soluble fibre, then the cement grout will not be self-supporting (preferably more than 0.05 wt. %).

The cement grout may also contain other optional ingredients. For example, additional fibres may be provided to the cement grout. For example, synthetic fibres such as polypropylene fibres may be added to increase the plugging characteristics of the cement grout. The required amount of fibres may be selected, in part, based upon the number of cracks or gaps in an underwater conduit as well as the size of the cracks or gaps.

The components of the cement grout may be mixed in any particular order. In addition, the cement grout may be fully mixed prior to being pumped. Alternately, the components may be added as separate streams which are combined together as the mixture passes through the pump. Alternatively, one or more of the ingredients may be added subsequent to the mixture being passed through a pump. For example, the psyllium husk may be provided to the mixture upstream of the pump, directly to the pump itself or, optionally, downstream from the pump. The psyllium husk is preferably added so as to permit the soluble fibre to hydrate and produce a gel prior to the cement grout being pumped into the conduit which is to be prepared. Accordingly, the cement grout as it enters the region to be repaired, is self supporting and, accordingly, has a relatively uniform consistency.

The cement grout is preferably prepared by combining the water and the cement to obtain a flowable cement slurry. Subsequently, the density adjustment agent may be added to the cement slurry to obtain a lightened slurry. The psyllium husk may then be combined with the lightened slurry to obtain a self supporting cement grout. According to this embodiment, the psyllium husk may be combined with the lightened slurry immediately upstream of the pump. Therefore, as the mixture passes through the pump, the cement grout is mixed to produce a relatively uniform consistency. An advantage of this embodiment is that the mixture is not gelatinous as it passes through the pump thereby reducing the demands on the pump. The cement grout is then conveyed to area A of conduit 20 to a gap 38 or the like which requires sealing by any means known in the art. For example, as shown in FIG. 2, a packer 42 may be positioned upstream and downstream of gap 38 and the cement grout delivered to area A of conduit 20 via a hose 44. As the cement grout passes through conduit 20, a portion of the material will flow in the direction of arrows 40 of FIG. 3 so as to fill gaps 38.

One advantage of the cement grout of this invention is that it may be pumped with, e.g., a piston pump, through a delivery hose as small as ¾ of an inch for at least one thousand feet. The cement grout may be conveyed to the location of a gap 38 or other crack by any means known in the art. For example, a packer may be inflated such that the injection ports are at the location of gap 38. Once the packer is in position, the grout may be pumped through injection ports in the packer so as to pass into gap 38. The packer may then be left in place to permit the cement to at least begin hydrating prior to the removal of the packer. For example, the packer may be left in place for, e.g., at least 4 hours and, preferably 6-10 hours to permit the cement grout to harden prior to it's removal. The amount of time that the packer is left in position may be varied based upon the rate of hydration of the cement such that the cement grout will be retained in position in the gap 38 once the packer is removed.

It would be appreciated by those skilled in the art that various modifications and changes may be made to the method and composting of this invention and all of these modifications and changes are within the scope of the following claims.

The invention claimed is:

1. An underwater grout comprising, as mixed:
   (a) from 40 to 50 wt% cement;
   (b) from 25 to 35 wt% water; and,
   (c) from 0.05 to 0.25 wt% psyllium husk, the psyllium husk comprising from 60 to 80 wt % soluble fibre and from 5 to 25 wt % insoluble fibre, based on the total weight of the psyllium husk;
   based on the total weight of the grout as mixed.

2. The underwater grout of claim 1 further comprising from 20 to 30 wt% of a density adjustment agent.

3. The underwater grout of claim 2 wherein the cement comprises Portland cement.

4. The underwater grout of claim 2, wherein the density adjustment agent is a density reducing agent.

5. The underwater grout of claim 4, wherein the density reducing agent comprises cenospheres.

* * * * *